May 27, 1969

W. C. DEE 3,446,150

FLUID BEARING PUMP

Filed May 29, 1967

INVENTOR:
WILLIAM C. DEE

United States Patent Office 3,446,150
Patented May 27, 1969

3,446,150
FLUID BEARING PUMP
William Colin Dee, Bournemouth, England, assignor to Gilbert Colin Davis, Johannesburg, Transvaal, Republic of South Africa
Filed May 29, 1967, Ser. No. 641,876
Int. Cl. F04d 13/06, 29/04
U.S. Cl. 103—87         10 Claims

ABSTRACT OF THE DISCLOSURE

Described is a pump for fluids in which a hollow rotor is supported in a stator by fluid bearing means in a bearing gap, the bearing fluid being under a pressure greater than the pressure of fluid to be pumped through the hollow rotor by impeller means in the hollow core as the rotor rotates. The rotor may be part of a motor, e.g. an electric motor.

---

Figure 1:
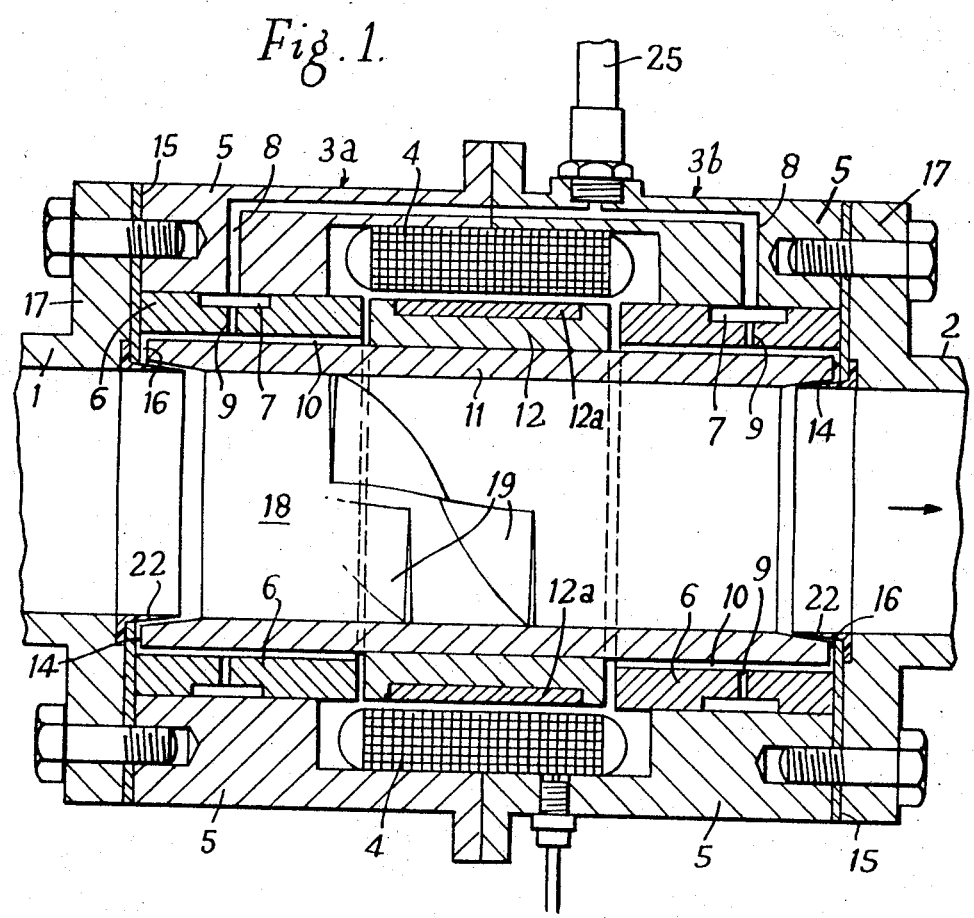

This invention relates to fluid bearings, and in particular to pumps having a moving member carried by such bearings.

The word "fluid" in this context refers to both gas and liquid.

One of the well-recognised advantages of fluid bearings is the substantially complete elimination of surface-to-surface friction, enabling moving members to be driven with a consumption of power which is substantially only that required to carry out the useful work to be done.

Conventional forms of fluid pump usually involve at least one change of direction of the individual portions of the fluid as they pass through the pump, so that work is done and power is consumed in merely accelerating and decelerating the fluid itself and overcoming its inertia. It is consequently desirable to provide pumps in which the fluid to be pumped can continue on a linear course substantially without any deflection due to the means used for pumping it. If such an arrangement can be contrived, the power consumption can be made very nearly strictly related to the work done on the fluid, e.g. the kinetic energy imparted to it or the load overcome.

The object of the present invention is to provide an improved form of fluid pump in which both the above discussed features are incorporated, with the result that the pump has an extremely high efficiency, compared with that of conventional fluid pumps, the term "efficiency" being used in the sense of the ratio of the energy imparted to the pumped fluid to the energy used in operating the pump.

According to the present invention a pump for fluids comprises a stator, and a rotor supported in said stator by fluid bearing means, said rotor including an axial bore for flow of fluid through the rotor and means within said bore adapted to coact with and impel the fluid through the rotor when the rotor rotates.

For the avoidance of turbulence and frictional losses in the fluid flow, the pump preferably includes means defining a first flow passage upstream of the rotor and a second flow passage downstream of the rotor, the bore of the rotor merging steplessly into said first and second flow passages.

The rotor may conveniently be electrically driven and may itself form or be incorporated in the rotor of an electric motor. Where only small loads are concerned, the rotor may be made of, or incorporate, suitable metal to enable it to be driven by eddy current action, and by way of example the rotor may conveniently take the form of a plain tube of steel, i.e. a tube with unvaried inner and outer diameters.

Where the pump is intended for use at greater loads that can conveniently be powered by eddy current action, it is preferable for the rotor to comprise an external armature, e.g. an annular attachment to the tube. Such an attachment may be in the form of, or include, elements for a squirrel-cage type of rotor.

Such a rotor will be subject to axial thrust in at least one direction. According to a further feature of the invention the pump comprises a thrust bearing, for the rotor, for one or both directions of axial thrust.

Where the rotor is a plain tube, each thrust bearing may be constituted by an end face of the tube itself. Where the rotor includes a radially projecting annular formation, the thrust faces may conveniently be formed on such radial projection. Alternately, the rotor itself may be made as a stepped tube, to provide radial thrust bearing faces.

Where end thrust bearings are provided for the rotor, there will tend to be a bleed of pressurised bearing fluid from the thrust bearing gaps into the interior of the tube, i.e. into the flow of fluid being pumped. That is to say that the pressure of the bearing fluid is greater than that of the fluid being pumped. It may accordingly be desirable in some instances to ensure that, in the event of lowering or of elimination of the pressurised bearing fluid supply, there is no leakage of the pumped fluid back into the bearing gaps. According to a further feature of the invention, in such a pump having the hearing gap opening into the path of flow of fluid through the rotor, closure means are provided at each thrust bearing gap to permit flow of fluid only outwardly therefrom.

Such closure means may be resiliently urged towards a condition of closing the gap, so as to be automatically self-closing. In a first form, the closure means is an annulus including a flange of a resiliently deformable material positioned to overlie the outlet of the bearing gap in a sealing manner but capable of being thrust away to open the gap under the pressure of the bearing fluid supply to the gap.

As an alternative, or in addition, to be resiliently self-closing, the closure means may be constructed to be closed by being carried along with any flow of the pumped fluid attempting to enter the thrust bearing gaps, and be thereafter held closed. Thus, according to a further feature of the invention the closure means are shiftable, to a condition of closing the gap, by the differential between the pressure of the pumped fluid and the pressure of the bearing fluid when the latter becomes lowered or reduced to zero.

In a second form, the closure means is an annulus having axially-extending blade portions which can be resiliently deflected radially into positions of greater and of lesser overlap at their side edges, said blade portions being positioned to overlie the outlet of the bearing gap in a sealing manner but being capable of being thrust away to open the gap under the pressure of the bearing fluid supply to the gap.

Means for coacting with the flow of fluid through the rotor may take the form of one or more blades, and preferably such means are designed in accordance with well known techniques so as to drive the fluid in as nearly as possible a truly axial and non-turbulent flow such that the power exerted on the rotor is transformed almost entirely into kinetic energy imparted to the fluid, with a minimum of frictional and heat loss.

It will be appreciated that, if the fluid to be pumped is contaminated, it will be convenient to provide the pump with a separate source of bearing fluid under pressure.

If the fluid to be pumped is clean enough to be usable also as a bearing fluid, the pump may be made to supply its own bearing fluid by providing a flow constrictor downstream of the pump and feeding a proportion of the pressurised pumped fluid to the bearing gaps as bearing fluid.

A pump of the nature described generally above may very conveniently be incorporated in an existing pipe line, by merely securing it to and between end flanges of portions of the pipe line. Where other considerations permit, the end face of such a flange may be made use of as a surface of a thrust bearing, but in other cases a thrust face component such as a ring may be included in the assembly of the pump itself.

Figure 2:
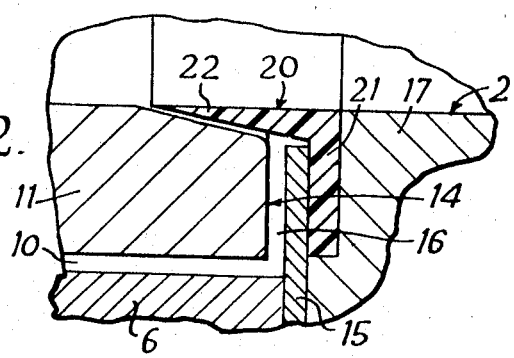

In order that the nature of the invention may be readily ascertained, an embodiment of pump in accordance therewith is hereinafter particularly described with reference to the accompanying drawing, wherein FIGURE 1 is a central axial section of the pump, and FIGURE 2 is an enlarged axial section of a detail.

In this drawing a pipe line includes an upstream portion 1 and a downstream portion 2. Between the two portions there is arranged a two-part pump housing 3a, 3b defining a central annular cavity for a set of stator field coils 4. Annular body portions 5 of the housing carry bearing sleeve outer members 6 having annular channels 7 receiving pressure air through passages 8. Bearing fluid under pressure is supplied through pipe 25 to passages 8. From each channel 7, a series of feed holes 9 arranged at equal angular spacings about the internal periphery of the member 6 lead the bearing air to the bearing gap 10 defined between the outer members 6 and a rotor 11 in the form of a tube. Centrally the rotor 11 carries an annulus 12 with metal inserts 12a to coact with the field coils 4, so that the whole forms an electric motor. The end faces 14 of the rotor 11 define, together with an inserted ring 15, a thrust bearing air gap 16 which is fed with pressure air from the journal bearing gap. Alternatively, the gap 16 could be defined between the end face 14 of the rotor and a radial end face of the pipe portion 1 or 2. The rings 15 are clamped in assembly by a flange 17 of the pipe.

The bore 18 of the rotor 11 is of the same diameter as the bore of the two pipe sections 1 and 2 and forms a smooth stepless continuation so that there is no turbulence in the flow of fluid. Within the rotor are positioned impeller blades 19 to coact with the flow and impart the drive to the fluid passing through the pump.

FIGURE 2 illustrates, to a much larger scale, an annulus 20 of resilient material having a ring portion 21 and an axial flange portion 22 which tapers to an edge. The ring portion 21 is clamped between the pipe section 1 or 2 and the adjacent ring 15 and the flange portion 22 overlies the gap 16 of the end thrust bearing, where it opens into the flow of fluid to be pumped. The flange is resilient and normally abuts against the rotor 11 to seal the gap, but can be thrust away (as illustrated) by the bearing fluid under pressure. If the pressure drops or fails, the flange 22 again abuts against the rotor 11 and seals the gap, and prevents passage of the pumped fluid into the thrust bearing gap.

The inner circumferential periphery of the annulus 20 forms a smooth stepless continuation of the bore of the pipe section 1, 2 and of the rotor tube 11.

I claim:
1. A pump for fluids comprising: a stator; means supplying bearing fluid at a pressure greater than the pressure of fluid being pumped, said means supplying fluid being connected to a passage means formed in said stator which connects with a bearing gap; a rotor supported in said stator in said bearing gap by bearing fluid, said rotor including an axial bore for flow of pumped fluid through said rotor; passage means connecting said gap and bore; and means within said bore adapted to coact with and impel pumped fluid through said rotor as said rotor rotates.

2. A pump, as claimed in claim 1, including means feeding a proportion of pressurized pumped fluid to a bearing gap as bearing fluid.

3. A pump, as claimed in claim 1, including a source of bearing fluid under pressure separate from pumped fluid.

4. A pump for fluids, as claimed in claim 1, including means defining a first flow passage upstream of the rotor and a second flow passage downstream of the rotor, the bore of the rotor merging steplessly into said first and second flow passages.

5. A pump for fluids, as claimed in claim 1, wherein the rotor is incorporated in a motor.

6. A pump for fluids, as claimed in claim 1, comprising thrust bearing means for the rotor.

7. A pump for fluids, as claimed in claim 6, wherein a thrust bearing includes a gap which opens into the path of flow of fluid through the rotor, and wherein closure means are provided at said thrust bearing gap to permit flow of fluid only outwardly therefrom.

8. A pump for fluids, as claimed in claim 7, wherein said closure means are resilient and are disposed normally to close said gap.

9. A pump for fluids, as claimed in claim 7, wherein said closure means comprise resiliently deformable material positioned to overlie said thrust bearing gap in a sealing manner and capable of being thrust away to open said gap under the pressure of bearing fluid supplied to said gap.

10. A pump for fluids, as claimed in claim 7, wherein said closure means are shiftable to close the gap under the differential of pressure between the pressure of the pumped fluid within the rotor and the pressure of the bearing fluid when the latter pressure becomes lowered.

References Cited

UNITED STATES PATENTS 3,218,981 11/1965 Kierulf.

FOREIGN PATENTS 485,225 5/1938 Great Britain.

ROBERT M. WALKER, *Primary Examiner.*

U.S. Cl. X.R.

308—9; 310—90